C. E. Butler,
Drilling Metals.

No. 102,090. Patented Apr. 19, 1870.

Alex. S. Rowley
Wheeler H. Clarke

Charles E. Butler

United States Patent Office.

CHARLES E. BUTLER, OF HUDSON, NEW YORK.

Letters Patent No. 102,090, dated April 19, 1870.

IMPROVED ADJUSTABLE HOLLOW DRILL.

The Schedule referred to in these Letters Patent and making part of the same.

I, CHARLES E. BUTLER, of the city of Hudson, in the county of Columbia and State of New York, have invented certain improvements in the so-called "self-centering chuck" of E. B. Beach, patented September 6, 1864, by which it is converted into an Adjustable Hollow Drill and Burrer.

The nature of my invention consists in making the sliding jaws of this chuck cutting instead of clamping-jaws, the object being to employ it not as a clutch or chuck for holding tools to be operated with, nor for holding the article or substance to be worked upon, but to be itself used as and for an adjustable hollow drill.

Description of the Accompanying Drawings.

Figure 2:
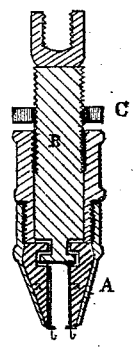
Figure 4:
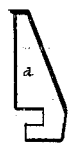
Figure 1:
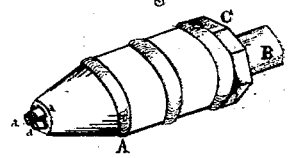
Figure 3:

Figure 1 is a perspective view of the hollow drill.
Figure 2 is a longitdinal section of the same.
Figure 3 is a view of the head or cutting-end of the jaws.
Figure 4 is a side view of one of the cutter-jaws detached.

General Description of the Invention.

The external form of this drill is cylindrical, with conical end slightly truncated at its apex.

The sliding jaws or cutters $a\ a\ a$, of which there should be three or more, are all incased by the conical shell A, which is screwed on the cylinder within, the latter being threaded for that purpose.

The forward or cutting ends of these jaws are constructed as represented in fig. 3 of the accompanying drawings, having a cutting-edge in the middle of each which extends a little below the inner edge or plane of the jaws. This form of cutter cuts smoothly and leaves a square shoulder.

Other forms of cutters may be employed for cutting tapers, or for leaving a beveled shoulder, or for forming a beveled or male center. The kind of work required to be done will readily suggest the form of cutter necessary to accomplish it.

The mandrel B of the drill is employed to regulate the size of the pivot, shaft, or pin it is desired to cut by expanding or contracting the cutter $a\ a\ a$; and, by means of the check-nut C and thread on the mandrel at the base of drill, the cutter-jaws are secured at any point of expansion or contraction required. Without this nut C the jaws are liable, when cutting hard metals, to slide, and thus to vary the size of the journal, pin, shaft, or other article being cut. This, therefore, becomes not only important, but a necessity in making this instrument an adjustable hollow drill.

I am aware, as before stated, that a patent has been granted to Edgar B. Beach for what he terms an "improved self-centering chuck," which is constructed generally as I propose to construct my adjustable hollow drill. I do not, however, claim any part of his invention; but What I do claim as my invention, and desire to secure by Letters Patent, is—

1. The cutting-lips on the ends of the jaws, as and for the purpose set forth.
2. The combination of the conical shell A, cutting-jaws $a\ a\ a$, mandrel B, and check-nut C, as and for the purpose set forth.

CHAS. E. BUTLER.

Witnesses:
ALEX. S. ROWLEY,
WHEELER H. CLARKE.